June 16, 1925.

E. SCHNEIDER 1,542,534

APPARATUS FOR ASCERTAINING THE ALTITUDE OF AERIAL TARGETS

Filed March 14, 1923   2 Sheets-Sheet 1

Inventor
Eugene Schneider

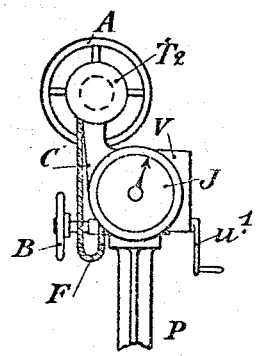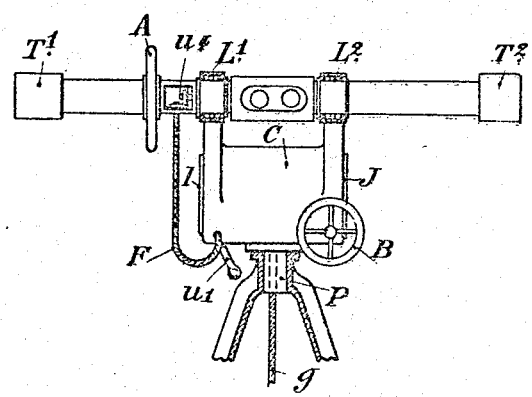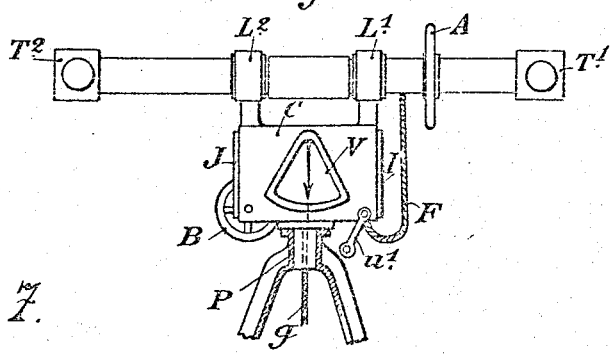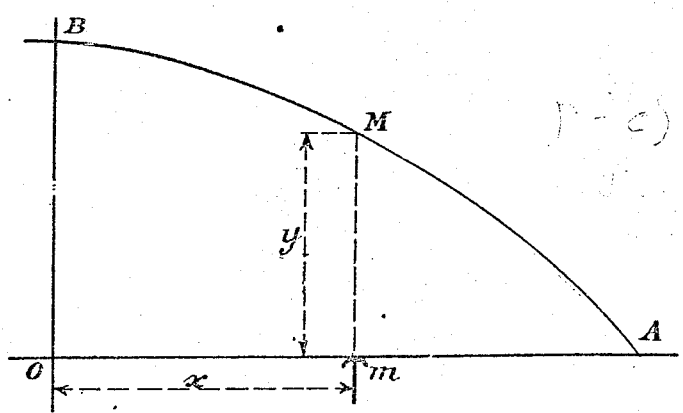

Patented June 16, 1925.

1,542,534

UNITED STATES PATENT OFFICE.

EUGENE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR ASCERTAINING THE ALTITUDE OF AERIAL TARGETS.

Application filed March 14, 1923. Serial No. 625,042.

*To all whom it may concern:*

Be it known that I, EUGENE SCHNEIDER, a citizen of the Republic of France, residing at Paris, France, have invented new and useful Improvements in Apparatus for Ascertaining the Altitude of Aerial Targets, which invention is fully set forth in the following specification.

In firing upon an aerial target (airship or aeroplane), when using an apparatus known under the name of "corrector" of the type described in Patent No. 1.345,697, it is necessary to be able to ascertain the altitude, assumed to be constant, at which the enemy is flying.

The present invention has for its object to provide improved apparatus for ascertaining directly the altitude of the aerial target by the use of a monostatic telemeter which may be of any suitable type.

It comprises broadly the combination, with a monostatic telemeter of an apparatus actuated for instance, by an auxiliary operator as a function of the site angle of the target. This simple actuation effects automatically the adjustment of the said telemeter; in other words, the combination which is the object of this invention relieves the telemeter operator of the necessity of constantly adjusting the telemeter, which operation is almost impossible in the case of a target so mobile as an airship or aeroplane.

In a word, this invention affords the very great advantage of simplifying considerably the service of the telemeter operator who becomes in reality an altimeter operator, and needs no longer to intervene, except in the exceptional case where the target changes its altitude.

In the accompanying drawings:

The diagrammatic Figure 1 which is given by way of example only, illustrates a constructional form of an improved mechanism for maintaining automatically the adjustment of the telemeter as a function of the site angle of the aerial target.

Figure 2 illustrates a general arrangement of the improved apparatus (the telemeter and automatic adjusting mechanism combined) assumed to be viewed from the direction of the altimeter operator.

Figure 3 is a view of a general arrangement of the improved apparatus viewed by an observer situated at the right hand of the altimeter operator.

Figure 4 is a general view of the improved apparatus assumed to be viewed from the direction of the auxiliary operator.

The diagrammatic Figure 7 illustrates a constructional detail.

If D is the distance of the aerial target, H its altitude, and $\alpha$ its site angle, we have then between these three magnitudes the relation:—

$$D = \frac{H}{\sin \alpha} \quad (1)$$

Further is $n$ is the number of revolutions to be given to the adjusting knob of the monostatic telemeter in order to bring its pointer from the position corresponding to an infinite distance into the position corresponding to the distance D, then for each type of apparatus there exists between $n$ and D a definite relation which can be expressed under the form $n = f(D)$.

By way of example the following dissertation is limited to the particular case of coincidence-telemeters for which—

$$n = \frac{K_1}{D} \quad (2)$$

where $K_1$ is a constant.

If in equation (2), D be replaced by its value (1), we get:—

$$n = \frac{K_1 \sin \alpha}{H} \quad (3)$$

Figure 1:
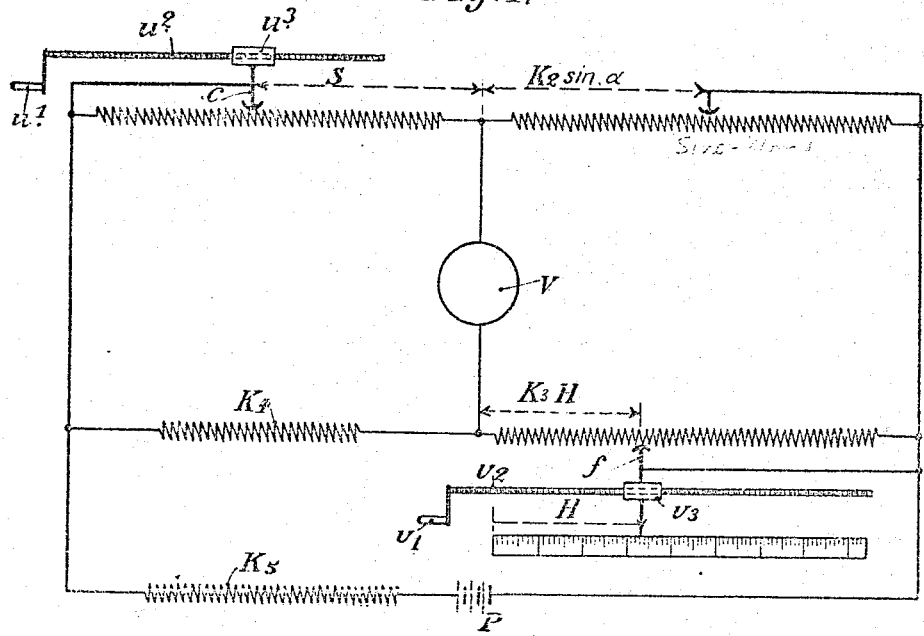

Assuming that a Wheatstone bridge (Fig. 1) is constituted with three arms having respectively the ohmic resistances $K_2 \sin \alpha$; $K_3$ H; and $K_4$, then the resistance S which must be introduced into the fourth arm for bringing the pointer of the voltmeter V back to zero, will be given by the formula:—

$$S = K_2 \cdot K_4 \frac{\sin \alpha}{K_3 \cdot H} \quad (4)$$

On comparing this with equation (3), it will be seen that:—

$$n = \frac{S K_1 \cdot K_3}{K_2 \cdot K_4} \quad (5)$$

This equation shows that the number of revolutions $n$ which must be given to the knob of the telemeter in order to maintain its adjustment, is proportional to the resistance S of the fourth arm of the bridge. This adjustment can then be effected very simply and continuously by actuating the knob of the telemeter by means of the screw $u^2$ which serves to drive the contact $c$.

In order to reduce the number of operators to a minimum, as well as to simplify the construction, the rheostat which introduces automatically the resistance $K_2 \sin \alpha$ is preferably mounted on the correcting apparatus (not shown) from which the indication of the site angle is taken.

The rheostats giving S, $K_3$, H and $K_4$ are mounted in a special casing C (Figs. 2, 3 and 4) which contains likewise the voltmeter V and the fixed resistance $K_5$ (Fig. 1) designed to limit the current supplied by the battery P.

The movable contact $c$ of the rheostat which gives S, is shifted for instance by an auxiliary operator entrusted with the duty of keeping the pointer of the voltmeter V on zero. This shifting is produced by means of the crank $u^1$, screw $u^2$ and nut $u^3$. The screw $u^2$ is connected for instance, by means of a flexible shaft F to the adjusting knob $u^4$ of the telemeter.

The movable contact $f$ of the rheostat that gives $K_3$ H, is shifted by the telemeter operator. This shifting is effected by means of the crank $v^1$, screw $v^2$ and nut $v^3$. The duties of the telemeter operator are thus reduced to the much simpler duties of an altimeter operator.

It is to be noted that the operation of the gunner actuating the site angle mechanism and the operation of the altimeter operator are entirely independent of each other, and do not affect or react in any way upon each other: this is one of the essential advantages of the improved apparatus.

In the construction of the rheostat which is to give $K_2 \sin \alpha$ the most simple means of obtaining the sinusoidal variation of the resistance consists in shifting proportionally to the angle $\alpha$, a movable contact of a rheostat constituted by a wire coiled with contacting turns around a strip of insulating material having a cosinusoidal profile.

Assuming in fact that upon a strip (which is assumed at first to have no thickness whatever) limited by the contour O A M B O (Fig. 7) defined by the straight lines O A and O B and the curve B M A which corresponds to the equation—

$$y = OB \cos\left[\frac{\pi}{2} \cdot \frac{1}{OA} \cdot x\right]$$

there is wound a very fine insulated wire having a diameter $dx$, a cross-section $q$ and a specific resistance of which is assumed to be $\rho$, then by baring the wire along the edge O A, a sliding contact $m$ can be caused to rub along said edge and the variable resistance $r$ of the rheostat thus formed will be given by the formula:—

$$r = \frac{\rho}{q} \Sigma 2y = \frac{2}{dx} \frac{\rho}{q} \Sigma y \, dx.$$

But if $dx$ is sufficiently small, it may be assumed that:—

$$\Sigma y \, dx = \int y \, dx = \int OB \left[\cos \frac{\pi}{2} \frac{1}{OA} \cdot x\right] dx$$

By integration we get:—

$$\Sigma y \cdot dx = OB \frac{2 OA}{\pi} \left[\sin \frac{\pi}{2} \cdot \frac{1}{OA} \cdot x\right]_{x=0}.$$

This gives:—

$$r = \frac{4 \cdot OA \cdot OB \cdot \rho}{\pi \cdot q \cdot dx} \sin\left[\frac{\pi}{2} \cdot \frac{1}{OA} \cdot x\right].$$

That is to say we get a rheostat which gives directly a sinusoidal resistance as a function of the adjustment $x$ of the sliding contact.

It is to be noted that if N is the number of turns and $t$ is the resistance of the mean turn, then since $$N = \frac{OA}{dx}; \text{ and } t = \frac{2}{\pi} \cdot 2 \cdot \frac{OB}{q} \cdot \rho,$$

the above formula will be reduced to:—

$$r = N \cdot t \left[\sin \frac{\pi}{2} \cdot \frac{1}{OA} \cdot x\right]$$

It is to be noted further that, in order to take into consideration the thickness $e$ of the insulating strip and the diameter of the wire, the theoretical profile as above defined, must be corrected by reducing all the ordinates by the constant length:—

$$e + \frac{dx}{2}.$$

In Figures 2, 3 and 4:—

$T_1$ $T_2$ designate the telemeter (supported on collars $L_1$ and $L_2$ with ball bearings) which can be adjusted to the site angle by rotating the hand wheel A.

C is a casing containing the rheostats that give the resistance $K_3$ H S and $K_4$. This casing is fixed to the collars $L_1$ and $L_2$, and can revolve around a vertical shaft P supported by a suitable foot.

B is a handwheel, by rotating which, the altimeter operator is able to vary the resistance of the rheostat giving $K_3 H$. It will be understood that hand wheel B is diagrammatically illustrated in Figure 1 by the crank $v^1$.

The azimuth direction is obtained by operating the handwheels A and B utilised as hand grips for the apparatus. $u^1$ is a crank which enables the auxiliary operator to return the pointer of the voltmeter V to zero by varying the resistance of the rheostat that gives S.

F is a flexible shaft which enables the rotation of $u^1$ to be transmitted to the adjusting knob $u^4$ of the telemeter.

$g$ is a two-wire cable connecting the rheostats contained in C to the rheostat that gives $K_2 \sin \alpha$, which is assumed to be mounted in the "corrector."

I is a dial from which the distance D is read.

J is a dial from which the altitude H is read directly.

The adjustment of the variable resistance $K_2 \sin \alpha$ is made in any suitable manner as, for example, by means of an operator positioned at the corrector referred to above. Adjustment of this resistance results in a displacement of the needle of the voltmeter. This needle is then returned to zero position by the operator who actuates the crank $u_1$ and, simultaneously actuates the adjusting knob $u_4$. If, when the voltmeter needle has been returned to zero position coincidence is not obtained in the telemeter, the telemeter operator actuates hand wheel B and further displaces the needle which is constantly returned to zero position by the operator actuating the crank $u_1$. It is in this manner that the telemeter operator controls the readings of the telemeter and the necessary coincidence.

For determining $n$, the Wheatstone bridge may be substituted by any equivalent electro-mechanical mechanism. Only the following modification will be described by way of example:—

If a constant voltage is available for feeding a potentiometer, it is easy to obtain a voltage proportional to $\sin \alpha$ (by constructing this potentiometer as hereinbefore indicated with respect to the rheostat giving $K_2 \sin \alpha$) and causing the pointer of a milliamperemeter to have a deflection proportional to $$\frac{\sin \alpha}{H}$$

(for instance by shunting it as a function of H). The operation of the knob $u_4$ of the telemeter is then effected by recopying the deflection of the millampere-meter, or better still, by acting upon the spiral spring of the millamperemeter in such a manner as to bring its pointer back to zero.

Figure 5:
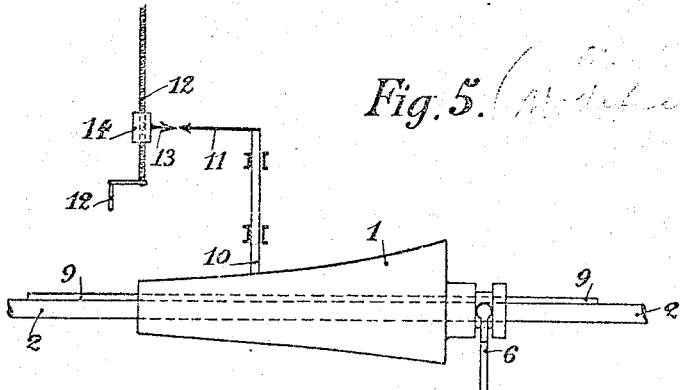
Figures 5 and 6 illustrate modifications of the improved apparatus shown in Figure 1.

It is likewise possible to obtain $n$ by purely mechanical means in the manner illustrated, by way of example in the diagrammatic Figure 5. In this figure: 1 is a camoid which can be slidden by the altimeter operator along the shaft 2 by actuating the hand-wheel 3 (which replaces the hand-wheel B of Figures 2, 3 and 4). This sliding movement is produced by the screw 4, the nut 5 and the fork 6. The nut 5 carries a pointer 7 adapted to move over a graduated scale 8 from which the altitude H can be read off. The shaft 2 is carried along in the site angle movements of the telemeter in such a manner as to make one complete revolution when the site angle varies from 0° to 90°.

The rotation of the shaft 2 is transmitted to the camoid 1 by a long key or feather 9. Upon this camoid 1 there bears the lower end 10 of a vertical rod, the upper end of which carries a pointer 11. For a determined position of the fork 6 that is to say for a determined value of the altitude H the displacements of the pointer 11 are rendered proportional to $\sin \alpha$ by the outline of the corresponding right-angle cross-section of the camoid.

On the other hand, for a determined value of $\alpha$ the displacements of 11 are rendered inversely proportional to H by the outline of the corresponding axial section of the camoid. The auxiliary operator maintains automatically the adjustment of the telemeter by acting upon the screw 12 (which replaces the screw $u^2$ of Figures 1, 2 and 3 and 4) connected to the adjusting knob, in such a manner as to bring, opposite to 11, a pointer 13 carried by the nut 14.

Figure 6:
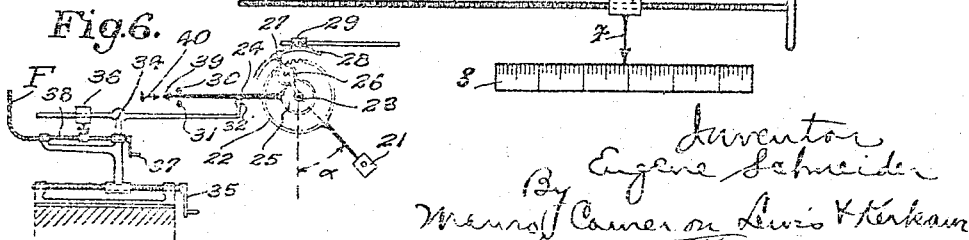

Figure 6 illustrates by way of example how the equation $$n = \frac{K_1 \sin \alpha}{H}$$

can be solved mechanically by balancing a couple equal to $K_1 \sin \alpha$ by a couple $n.H$ produced by an effort $n$ acting through a leverage equal to H; the effort $n$ itself being obtained by displacing a constant weight through a distance proportional to $n$.

In this figure: 21 is a weight attached to the end of a lever fixed to the internal toothed pinion 22 that is loose on the shaft 23; 24 is a lever fixed to the pinion 25 that is loose on the shaft 23; 26 is a pinion so arranged as to constitute a plane differential with 22 and 25; 27 is a lever movable around 23 and carrying the axle-pin of 26 and terminating in a toothed sector 28 which meshes with a worm 29. The movements of the lever 24 are limited by two fixed stops 30 and 31. The worm 29, being connected to the operating site-angle mechanism in such a manner that the lever carrying 21 will always enclose with the vertical an angle equal to $z$, it is obvious that the couple transmitted to the lever 24 is proportional to sin $z$.

The equilibrium of the lever 24 is obtained by causing an upward vertical effort to come into action through the intermediary of the roller 32. The roller 32 is mounted on the end of a lever 33 adapted to rock around the point of suspension 34 which can be displaced by acting upon the hand crank 35 (which plays the same part as the hand-wheel B of Figures 2, 3 and 4) in such a manner that the distance between 32 and 23 shall be proportional to H. The effort which is to be transmitted by 32 will, under these conditions, be proportional to $n$. This effort is produced by displacing the weight 36 along the prolongation of 33. For this purpose the auxiliary operator operates the hand crank 37 mounted on the screw 38 (which replaces the screw $u^2$ of Figures 1, 2, 3 and 4) connected to the adjusting knob of the telemeter, in such a manner so as to bring the pointer 39, which is fixed to 24, opposite the fixed register mark 40.

The invention will still remain applicable when in addition to the altimeter operator, two further operators are provided, namely, an operator having the duty of keeping the telemeter directed along the site angle by means of a hand-wheel such as A, with the help, in that case, of a site-angle telescope mounted upon $T^1$, $T^2$. The second operator would have the duty of keeping the azimuth. For this purpose he would have to operate the casing C and he would have a special telescope provided for his use. The altimeter operator would then only have to operate the hand-wheel B of Figures 2, 3 and 4 (or the hand-wheel 3 of Figure 5) in order to follow any occurring variations in the altitude of the moving target.

When it is desired to employ the apparatus of the present invention on board warships, the entire apparatus may be mounted on a gyroscopic support of the type described in my application Serial No. 527,277 filed January 5, 1922, for "installation for firing on board warships".

The invention is capable of receiving a variety of mechanical expressions, some of which have been illustrated on the acompanying drawings but it is to be expressly understood that the drawings are for purposes of illustration only and are not designed as a definition of the limits of the invention. The term "telemeter" as herein employed, is not limited to monostatic telemeters of the coincidence type since it includes other suitable types, as for example, a telemeter of the stereoscopic type. Reference is therefore to be had to the claims hereto appended for a definition of the limits of the invention.

What I claim is:—

1. An apparatus for measuring the altitude of a moving aerial target comprising supporting means, a telemeter mounted on the supporting means and having an adjusting member, a movable indicator carried by the supporting means, means for moving the indicator as a function of the sight angle of the target, means for moving the indicator proportionally to the altitude of the target, and means operatively connected to said adjusting member for returning the indicator to normal position.

2. A device of the class described comprising, in combination with a telemeter having an adjusting knob, a voltmeter having a movable pointer, variable resistance means for moving said pointer proportionally to the angle of sight of a target, means including a variable resistance for moving said pointer proportionately to the altitude of the target, and means operatively connected to said adjusting knob for returning the pointer to normal position.

3. A device of the class described comprising in combination with a telemeter of the coincidence type having an adjusting knob, a voltmeter, a plurality of resistances connected to said voltmeter, a source of current connected to the resistances and voltmeter, means for moving the pointer of the voltmeter in accordance with the variations in the angle of sight and altitude of the target and means operatively connected to said adjusting knob for returning said pointer to normal position.

4. A device of the class described comprising in combination with a telemeter having an adjusting member, a movable indicator, means for moving said indicator proportionally to the angle of sight of a target, means including a movable pointer for moving said indicator proportionally to the altitude of the target, an altitude scale positioned adjacent said pointer, means including a movable pointer operatively connected to said adjusting member for returning said indicator to normal position, and a distance scale mounted adjacent said last named pointer.

5. In combination, a telemeter having an adjusting knob, a Wheatstone bridge comprising a plurality of resistances and a voltmeter, means for varying one of said resistances as a function of the angle of sight of a target, means for varying another of said resistances in accordance with the altitude of the target, the variation of said resistances resulting in the deflection of the needle of the voltmeter, and means operatively connected to said adjusting knob for varying another of said resistances whereby the pointer of the voltmeter is returned to normal position.

6. In combination, a casing, a telemeter mounted on the casing and having an adjusting knob, means including a voltmeter carried by said casing, a plurality of resistances carried by the casing, means for varying one of said resistances to effect a displacement of the needle of the voltmeter, means for returning said needle to normal position, and a flexible member connected to said last named means and to said adjusting knob.

Dated this 8th day of January, 1923.

In testimony whereof I have signed this specification.

EUGENE SCHNEIDER.

Witnesses:
ANDRÉ NOSTICKER,
LOUIS GARDET.